United States Patent
Lee et al.

(10) Patent No.: US 10,908,457 B2
(45) Date of Patent: Feb. 2, 2021

(54) OPTICAL MEMBER AND DISPLAY DEVICE INCLUDING THE SAME

(71) Applicant: Samsung Display Co., Ltd., Yongin-si (KR)

(72) Inventors: Sang Won Lee, Seoul (KR); Sung Kyu Shim, Seoul (KR); Seong Yong Hwang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 16/049,812

(22) Filed: Jul. 31, 2018

(65) Prior Publication Data

US 2019/0163018 A1 May 30, 2019

(30) Foreign Application Priority Data

Nov. 30, 2017 (KR) .................... 10-2017-0162969

(51) Int. Cl.
G02F 1/1335 (2006.01)
G02F 1/13357 (2006.01)

(52) U.S. Cl.
CPC .. *G02F 1/133606* (2013.01); *G02F 1/133603* (2013.01); *G02F 1/133611* (2013.01); *G02F 1/133617* (2013.01); *G02F 2001/133607* (2013.01); *G02F 2001/133614* (2013.01)

(58) Field of Classification Search
CPC ......... G02F 1/133606; G02F 1/133603; G02F 2001/133614; G02F 2001/133607; G02F 1/133611; G02F 1/133617

USPC ................................................... 362/84, 97.3
See application file for complete search history.

(56) References Cited

U.S. PATENT DOCUMENTS

| | | | |
|---|---|---|---|
| 2009/0067178 A1 | 3/2009 | Huang et al. | |
| 2012/0113672 A1 | 5/2012 | Dubrow et al. | |
| 2015/0330604 A1* | 11/2015 | Tsukahara | G02B 6/0038 362/97.2 |
| 2015/0338567 A1* | 11/2015 | Stevenson | G02B 6/0051 362/601 |
| 2017/0160591 A1* | 6/2017 | Cho | G02B 5/0257 |
| 2018/0364408 A1 | 12/2018 | Hwang et al. | |
| 2019/0011779 A1 | 1/2019 | Lee et al. | |

FOREIGN PATENT DOCUMENTS

| | | |
|---|---|---|
| JP | 2016181474 A * | 10/2016 |
| KR | 10-2013-0120486 | 11/2013 |
| KR | 10-2015-0070851 | 6/2015 |
| KR | 10-2018-0137627 | 12/2018 |
| KR | 10-2019-0006137 | 1/2019 |

* cited by examiner

*Primary Examiner* — Karabi Guharay
(74) *Attorney, Agent, or Firm* — H.C. Park & Associates, PLC

(57) ABSTRACT

An optical member and display device, the optical member including a diffuser plate, a wavelength conversion layer disposed on a top surface of the diffuser plate, a passivation layer disposed on the wavelength conversion layer and covering a side surface of the wavelength conversion layer on at least one side thereof, and a diffusing pattern layer disposed on and in direct contact with a bottom surface of the diffuser plate and containing diffusion particles.

4 Claims, 14 Drawing Sheets

OPTICAL MEMBER AND DISPLAY DEVICE INCLUDING THE SAME

CROSS REFERENCE TO RELATED APPLICATION

This application claims priority from and the benefit of Korean Patent Application No. 10-2017-0162969, filed on Nov. 30, 2017, which is hereby incorporated by reference for all purposes as if fully set forth herein.

BACKGROUND

Field

Exemplary embodiments of the invention relate generally to an optical member and, more specifically, to a display including the same.

Discussion of the Background

Liquid-crystal display devices occupy a very large portion in the information display technology. A liquid crystal display device includes two glass substrates and a liquid crystal layer sandwiched therebetween. An electrode is formed on each glass substrate, and a voltage is applied to adjust the orientation of the liquid crystal to display information by adjusting the amount of light transmittance.

Such liquid-crystal display devices are light-receiving devices that cannot emit light on their own but instead display images by adjusting the amount of light transmittance coming from the outside. Accordingly, liquid-crystal display devices require a separate device for irradiating light to the display panel, i.e., a backlight unit.

Backlight units are divided into a direct-lit backlight unit and an edge-lit backlight unit depending on the arrangement of the light sources. The edge-lit backlight unit has a structure in which the light sources are disposed on one side of the light guide plate. The direct-lit backlight unit has a structure in which the light sources are disposed under the display. Particularly, the direct-lit backlight unit is advantageous for implementing a narrow bezel in that it does not require a bezel area for disposition of the light sources.

The above information disclosed in this Background section is only for understanding of the background of the inventive concepts, and, therefore, it may contain information that does not constitute prior art.

SUMMARY

Exemplary embodiments of the invention provide a display device having a narrow bezel.

Exemplary embodiments of the invention also provide a display device with improved luminance uniformity.

Additional features of the inventive concepts will be set forth in the description which follows, and in part will be apparent from the description, or may be learned by practice of the inventive concepts.

An exemplary embodiment of the invention provides an optical member that is an integrated single member and can perform wavelength conversion and light diffusion. In addition, according to an exemplary embodiment, the integrated single member has a relatively small thickness and the assembly process of the display device can become simpler.

An exemplary embodiment of the invention also provides an optical member including a diffuser plate, a wavelength conversion layer disposed on a top surface of the diffuser plate, a passivation layer disposed on the wavelength conversion layer and covering a side surface of the wavelength conversion layer on at least one side thereof, and a diffusing pattern layer disposed on and in direct contact with a bottom surface of the diffuser plate and containing diffusion particles.

An optical member may include a diffuser plate including a diffusing pattern, a wavelength conversion layer disposed on a top surface of the diffuser plate, and a passivation layer disposed on the wavelength conversion layer and covering a side surface of the wavelength conversion layer on at least one side thereof.

A display device may include an optical member including a diffuser plate, a wavelength conversion layer disposed on a top surface of the diffuser plate, a passivation layer disposed on the wavelength conversion layer and covering a side surface of the wavelength conversion layer on at least one side thereof, and a diffusing pattern layer disposed on a bottom surface of the diffuser plate, a light source disposed under the optical member, and a display panel disposed above the optical member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
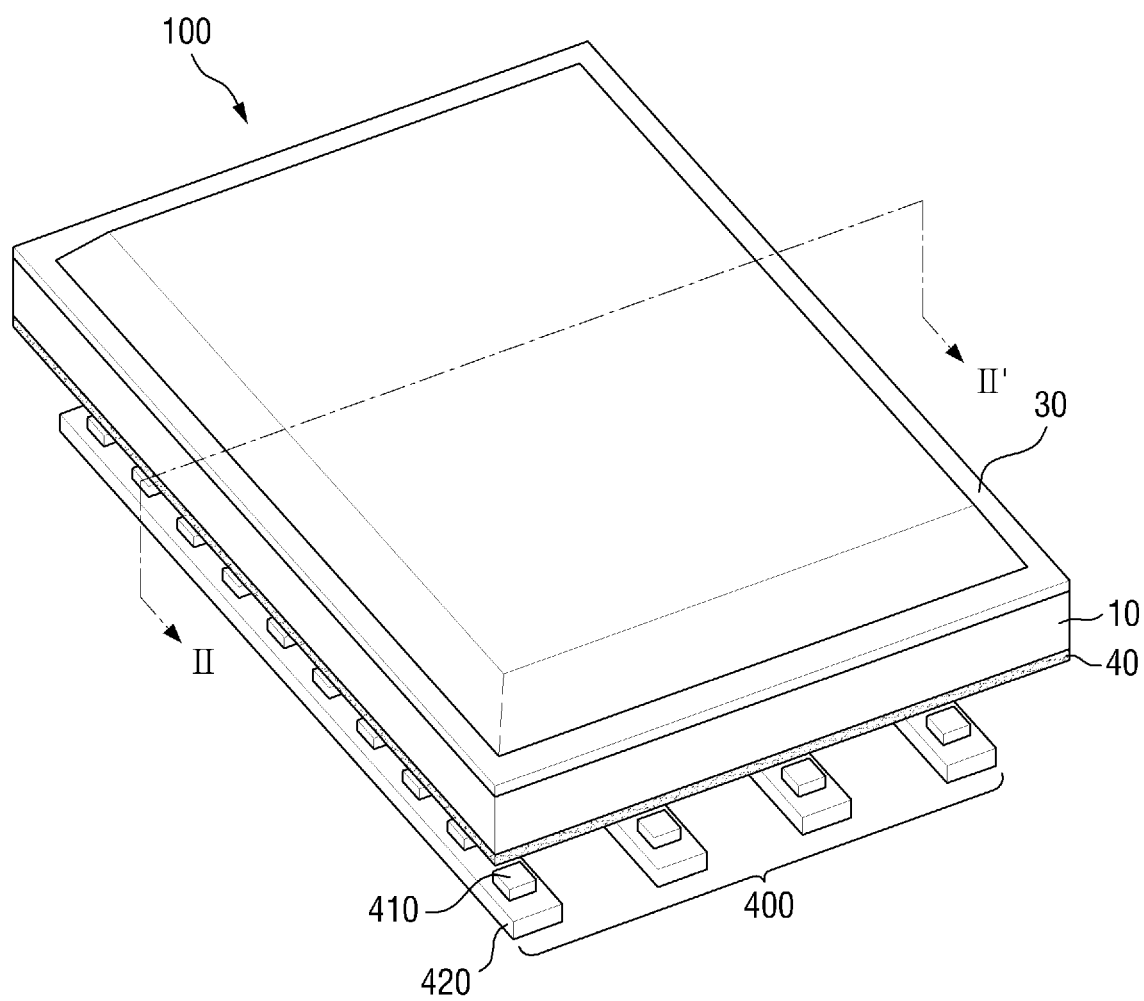
FIG. 1 is a perspective view of a display device according to an exemplary embodiment of the invention.

In the following description, for the purposes of explanation, numerous specific details are set forth in order to provide a thorough understanding of various exemplary embodiments or implementations of the invention. As used herein "embodiments" and "implementations" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
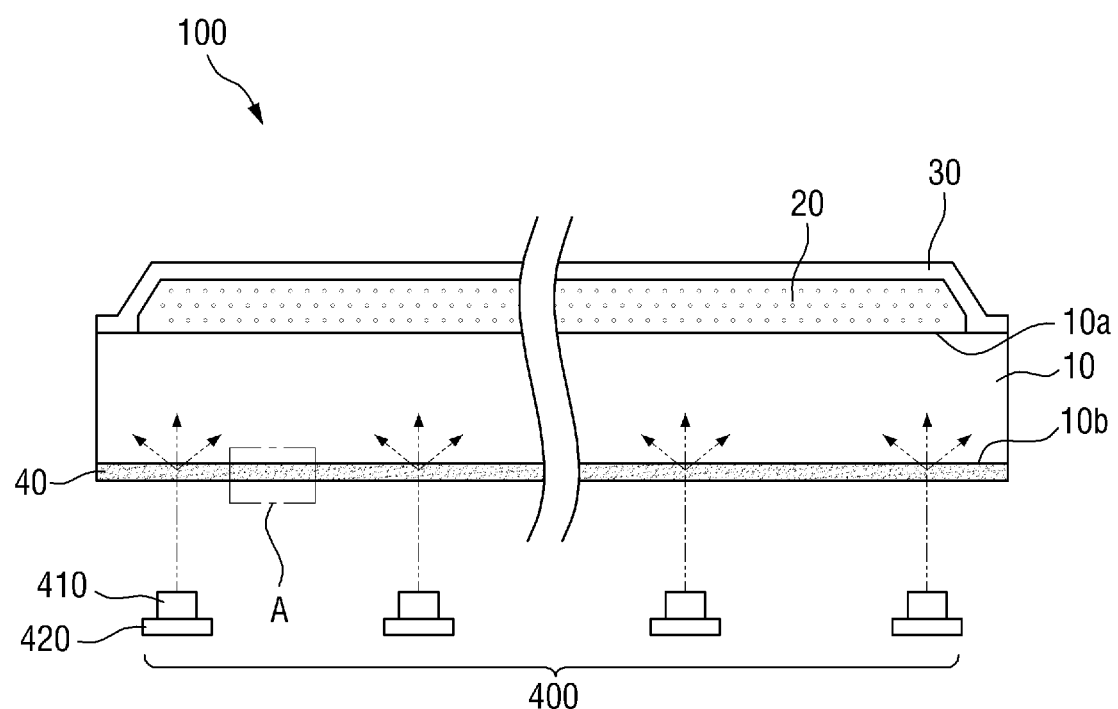
FIG. 2 is a cross-sectional view taken along line II-II' of FIG. 1.

FIG. 1 is a perspective view of a display device according to an exemplary embodiment of the invention. FIG. 2 is a cross-sectional view taken along line II-II' of FIG. 1.

Referring to FIGS. 1 and 2, an optical member 100 includes a diffuser plate 10, a wavelength conversion layer 20 disposed on a top surface 10a of the diffuser plate 10, a passivation layer 30 disposed on the wavelength conversion layer 20, and a diffusing pattern 40 disposed on a bottom surface 10b of the diffuser plate 10. The diffuser plate 10, the wavelength conversion layer 20, the passivation layer 30, and the diffusing pattern 40 may be integrally combined.

The diffuser plate 10 works to disperse and diffuse the light emitted from light sources 400 to improve the light uniformity. The diffuser plate 10 has diffusibility (haze) characteristics and good light transmittance capability in order to compensate for the straight propagation of light from the light sources 400, thereby achieving uniform brightness. In some embodiments of the inventive concepts, the haze value of the diffuser plate 10 may be equal to or greater than approximately 90%, and the light transmittance may range from 50% to 70%. When the haze value is 90% or more, light can be sufficiently diffused, and thus, excellent light uniformity can be achieved. Generally, as the haze value increases, the light transmittance becomes lower. When the light transmittance is too low, sufficient luminance cannot be achieved on the display screen. In view of the above, the light transmittance of the diffuser plate 10 may range from 50% to 70%.

The diffuser plate 10 may include an inorganic material. For example, the diffuser plate 10 may be made of, but is not limited to, glass.

The diffuser plate 10 may have a generally polygonal columnar shape. The diffuser plate 10 may have, but is not limited to, a rectangular shape when viewed from the top in a plan view. In an exemplary embodiment, the diffuser plate 10 has a box shape, which has a rectangular shape when viewed from the top in a plan view, and may include the top surface 10a, the bottom surface 10b, and four side surfaces.

In one application of the optical member 100, the light sources 400 may be disposed adjacent to the bottom surface 10b of the diffuser plate 10. The light sources 400 may include printed circuit boards 420 and a plurality of LED light sources 410 mounted on the printed circuit board 420, respectively.

The light sources 400 may include a plurality of printed circuit boards 420. The printed circuit boards 420 may be arranged in a direction parallel to the longer sides or the shorter sides of the diffuser plate 10. The distance between the LED light sources 410 may vary depending on the spacing between the printed circuit boards 420. Although FIG. 1 shows that the printed circuit boards 420 may be arranged in parallel with the longer sides of the diffuser plate 10, and that the distance between the LED light sources 410 in the shorter side direction of the diffuser plate 10 may be greater than the distance between the LED light sources 410 in the longer side direction, this is merely illustrative. For example, the LED light sources 410 may be spaced apart from one another equally in the longer side direction and in the shorter side direction of the diffuser plate 10.

The wavelength conversion layer 20 is disposed on the top surface 10a of the diffuser plate 10. The wavelength conversion layer 20 converts the wavelength of at least a part of incident light. The wavelength conversion layer 20 may include a plurality of wavelength conversion particles.

The wavelength conversion particles are for converting the wavelength of incident light, and may be, for example, quantum dots (QD), a fluorescent material, or a phosphorescent material. Quantum dots, which are one example of wavelength-covering particles, will be further described. A quantum dot is a material with a crystal structure of several nanometers in size, and consists of hundreds to thousands of atoms. It exhibits a "quantum confinement effect" which leads to an increase in the energy band gap due to the small size. When a light of a wavelength having an energy level higher than the bandgap is incident on a quantum dot, the quantum dot is excited by absorbing the light and relaxed to the ground state while emitting light of a particular wavelength. The emitted light of the wavelength has a value corresponding to the band gap. By controlling the size and composition of the quantum dots, the luminescence characteristics due to the quantum confinement effect can be controlled.

A quantum dot may include, for example, at least one of a group II-VI compound, a group II-V compound, a group III-VI compound, a group III-V compound, a group IV-VI compound, a group compound, a group II-IV-VI compound, and a group II-IV-V compound.

A quantum dot may include a core and a shell overcoating the core. The core may be, but not limited to, at least one of CdS, CdSe, CdTe, ZnS, ZnSe, ZnTe, GaN, GaP, GaAs, GaSb, AlN, AlP, AlAs, AlSb, InP, InAs, InSb, SiC, Ca, Se, In, P, Fe, Pt, Ni, Co, Al, Ag, Au, Cu, FePt, Fe2O3, Fe3O4, Si and Ge. The shell may include, but not limited to, at least one of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe.

The wavelength conversion particles may include a number of wavelength conversion particles that convert incident light into different wavelengths. For example, the wavelength conversion particles may include first wavelength conversion particles that convert incident light of a specific wavelength into a first wavelength to emit it, and second wavelength conversion particles that convert the incident light into a second wavelength to emit it. In an exemplary embodiment, the light emitted from the light sources 400 and incident on the wavelength conversion particle may be blue light, the first wavelength may be a green wavelength, and the second wavelength may be a red wavelength. For example, the blue wavelength may have a peak at 420 to 470 nm, the green wavelength may have a peak at 520 to 570 nm, and the red wavelength may have a peak at 620 to 670 nm. It is, however, to be understood that the wavelengths of red, green, and blue are not limited to the above numerical values and encompass all wavelength ranges that can be recognized in the art as red, green, and blue.

In the above exemplary embodiment, the blue light incident on the wavelength conversion layer 20 passes through the wavelength conversion layer 20, a part of which is incident on the first wavelength conversion particles to be converted into the green wavelength and emitted. Another part of the light is incident on the second wavelength conversion particles to be converted into the red wavelength and emitted. The other part of the light is incident neither on the first wavelength conversion particles nor the second wavelength conversion particles, and may be emitted as it is. Accordingly, the light passing through the wavelength conversion layer 20 includes all of the blue wavelength light, the green wavelength light, and the red wavelength light. By adjusting the ratio of the emitted lights of different wavelengths appropriately, white light or light of another color can exit and be displayed. The lights converted in the wavelength conversion layer 20 are concentrated within a narrow range of specific wavelengths and have a sharp spectrum with a narrow half width. Therefore, by filtering the light of such spectrum by a color filter to reproduce colors, the color gamut can be improved.

Unlike the above exemplary embodiment, the incident light may be light of a short wavelength, such as ultraviolet light, and three kinds of wavelength conversion particles may be disposed in the wavelength conversion layer 20 for converting the incident light into blue, green and red wavelengths, thereby emitting white light.

The wavelength conversion layer 20 may further include scattering particles. The scattering particles may be non-quantum dots, which do not perform wavelength conversion. The scattering particles scatter the incident light so that more incident light can be incident on the wavelength conversion particles. In addition, the scattering particles may regulate the exit angles of lights having different wavelengths. Specifically, when a part of the incident light is incident on the wavelength converting particles and then the wavelength is converted and emitted, the emitting direction has a random scattering characteristic. If there are no scattering particles in the wavelength conversion layer 20, the green and red wavelengths exiting after collision with the wavelength conversion particles have scattering characteristics, but the blue wavelengths exiting without collision with the wavelength conversion particles have no scattering characteristic. Therefore, the amount of exiting light of the blue/green/red wavelength will become different depending on the exit angle. The scattering particles provide scattering characteristics even to the light of the blue wavelength that do not collide with the wavelength conversion particles, so that the exiting angles of the light having different wavelengths can be regulated. As the scattering particles, $TiO_2$, $SiO_2$ and the like may be used.

The thickness of the wavelength conversion layer 20 may range approximately from 10 to 50 μm. In an exemplary embodiment, the thickness of the wavelength conversion layer 20 may be approximately 15 μm.

The wavelength conversion layer 20 covers most of the top surface 10a of the diffuser plate 10 and may expose a part of the edge of the diffuser plate 10. In other words, the side surface of the diffuser plate 10 may protrude from the side surface of the wavelength conversion layer 20. The top surface 10a of the diffuser plate 10 exposed by the wavelength conversion layer 20 provides a space where the side surface of the wavelength conversion layer 20 can be stably covered by the passivation layer 30.

The wavelength conversion layer 20 may be formed by coating and the like. For example, wavelength conversion composition may be slit coated on the diffuser plate 10, followed by drying and curing, to form the wavelength conversion layer 20. However, this is merely illustrative. A variety of other stacking methods may be employed.

The passivation layer 30 is disposed on the wavelength conversion layer 20. The passivation layer 30 serves to prevent permeation of moisture and/or oxygen (hereinafter referred to as "moisture/oxygen").

The passivation layer 30 may include an inorganic material. For example, the passivation layer 30 may include silicon nitride, aluminum nitride, zirconium nitride, titanium nitride, hafnium nitride, tantalum nitride, silicon oxide, aluminum oxide, titanium oxide, tin oxide, cerium oxide and silicon oxynitride, or a metal thin film with light transmittance. In an exemplary embodiment, the passivation layer 30 may be made of silicon nitride.

The passivation layer 30 may completely cover the wavelength conversion layer 20 on at least one side thereof. In an exemplary embodiment, the passivation layer 30 may completely cover the wavelength conversion layer 20 on all sides, for example.

The passivation layer 30 completely overlaps the wavelength conversion layer 20 and covers the top surface of the wavelength conversion layer 20. It may be further extended outwardly to cover the side surface of the wavelength conversion layer 20. The passivation layer 30 may be extended to the top surface 10a of the diffuser plate 10 exposed by the wavelength conversion layer 20, so that a part of the edge of the passivation layer 30 may come in contact with the top surface 10a of the diffuser plate 10. In an exemplary embodiment, the side surface of the passivation layer 30 may be aligned with the side surface of the diffuser plate 10.

The thickness of the passivation layer 30 may be less than the thickness of the wavelength conversion layer 20. The thickness of the passivation layer 30 may range from approximately 0.1 to 2 μm. If the thickness of the passivation layer 30 is approximately 0.1 μm or more, the passivation layer 30 can actually prevent permeation of moisture/oxygen. If the thickness is approximately 0.3 μm or more, the passivation layer 30 can effectively prevent permeation of moisture/oxygen. The passivation layer 30 having a thickness of approximately 2 μm or less is advantageous in terms of reducing the size and increasing the transmittance. In an exemplary embodiment, the thickness of the passivation layer 30 may be approximately 0.4 μm.

The wavelength conversion layer 20, especially the wavelength conversion particles included therein, is vulnerable to moisture/oxygen. When a wavelength conversion film is employed, the barrier films are stacked on top and bottom surfaces of the wavelength conversion layer to prevent water/oxygen permeation into the wavelength conversion layer. According to this exemplary embodiment, however, the wavelength conversion layer 20 is directly disposed with no barrier film, and thus, a sealing structure for protecting the wavelength conversion layer 20 is required. The sealing structure may be implemented by the passivation layer 30 and the diffuser plate 10.

The moisture can permeate the wavelength conversion layer 20 through the top surface, the side surfaces, and the bottom surface of the wavelength conversion layer 20. As described above, the top surface and the side surfaces of the wavelength conversion layer 20 are covered and protected by the passivation layer 30, and the bottom surface of the wavelength conversion layer 20 is protected by the diffuser plate 10. As a result, the moisture/oxygen permeation can be blocked or at least decreased (hereinafter referred to as "block/decrease").

The passivation layer 30 may be formed by deposition or the like. For example, the passivation layer 30 may be formed on the diffuser plate 10 on which the wavelength conversion layer 20 is formed by chemical vapor deposition. However, this is merely illustrative. A variety of other stacking methods may be employed.

The diffusing pattern 40 may be disposed on the bottom surface 10b of the diffuser plate 10. The diffusing pattern 40 can diffuse light and generally distribute the light uniformly. Specifically, since the light passing through the diffusing pattern 40 exits in random directions, the traveling direction of light may be changed to have an overall uniform light distribution regardless of the arrangement of the light sources 400.

Different amounts of light may be incident on different regions. A larger amount of light will be incident on a region closer to the light sources 400. Such a difference in the amount of light across the regions may result in undesirable white portions and dark portions appearing on the display screen. The diffusing pattern 40 is disposed on the bottom surface 10b of the diffuser plate 10 to uniformly distribute the light, thereby reducing the difference in the amount of light across the regions.

In an exemplary embodiment, the diffusing pattern 40 may be disposed as a separate layer. For example, a diffusing pattern layer including diffusion particles may be disposed on the bottom surface 10b of the diffuser plate 10 to function as the diffusing pattern 40.

In another exemplary embodiment, the diffusing pattern 40 may be formed as the surface of the diffuser plate 10, or may be formed inside the diffuser plate 10. An example where the diffusing pattern 40 is formed as the surface of the diffusion plate 10 will be described later. Hereinafter, with reference to FIG. 3, an example where the diffusing pattern 40 is disposed on the bottom surface 10b of the diffusion plate 10 as a separate layer will be described.

Figure 3:
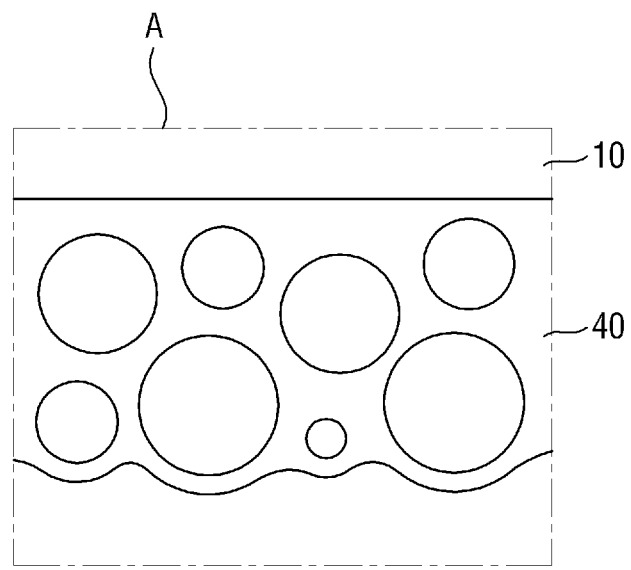
FIG. 3 is an enlarged cross-sectional view of region "A" of FIG. 2.

FIG. 3 is an enlarged cross-sectional view of region "A" of FIG. 2.

Referring to FIG. 3, the diffusing pattern 40 may include a binder layer and diffusion particles dispersed in the binder layer. The binder layer is a medium in which the diffusion particles are dispersed and may be made of various resin compositions, which can be typically referred to as a binder. However, this is merely illustrative. Any medium can be referred to as the "binder layer" irrespective of its name, additional other functionality, and its composition material, as long as it can disperse the diffusion particles.

The diffusion particles can diffuse the incident light to change the traveling direction of the light in different directions. Typically, light propagates in a straight line and accordingly light propagates at an angle that it is emitted from the light sources. As a result, a larger amount of light is incident on a side closer to the light sources while a less amount of light is incident on a side distant from the light sources. The diffusion particles may change the propagation angle of the light emitted from the light sources to guide light to a region where the amount of the light is relatively insufficient.

The diffusion particles may be made of, but are not limited to, silicon, $TiO_2$, $SiO_2$, ZnO, $ZrO_2$, $AlO_2$, Al, Ag, or a combination thereof. The diffusion particles may also be made of various materials having diffusion properties.

The diffusing pattern 40 may cover the entire bottom surface 10b of the diffuser plate 10. The side surface of the diffusing pattern 40 may be aligned with the side surface of the diffuser plate 10.

The diffusing pattern 40 may be formed by silk screen printing or the like. For example, diffusion particle composition may be printed on the diffuser plate 10, and then is dried to form the diffusing pattern 40. However, this is merely illustrative. A variety of other stacking methods may be employed.

The thickness of the diffusing pattern 40 may range from approximately 2 to 5 μm, and preferably approximately 2 to 3 μm. In an exemplary embodiment, the thickness of the diffusing pattern 40 may be approximately 2 μm.

Light diffused in different directions by the diffusing pattern 40 at the lower portion of the diffuser plate 10 may be scattered and diffused again by the wavelength conversion layer 20. As a result, the uniformity of the light is increased, and the difference in bright portions and dark portions can be prevented from being observed on the display screen.

As described above, the optical member 100 may simultaneously perform the light diffusion and the wavelength conversion as an integrated single member. The integrated single member can simplify the assembly process of the display device. In addition, by sealing the wavelength conversion layer 20 with the passivation layer 30 or the like, it is possible to prevent deterioration of the wavelength conversion layer 20. In addition, the optical member 100 can diffuse the light more effectively by disposing the diffusing pattern 40 on the bottom surface 10b of the diffuser plate 10.

In addition, the fabricating cost can be reduced and the thickness can be decreased, as compared with a device in which the wavelength conversion layer 20 of the optical member 100, the sealing structure thereof and the diffusing pattern 40 are provided as separate films (for example, a wavelength conversion film and a diffusing pattern film).

Hereinafter, optical members according to other exemplary embodiments will be described. In the following description, the same or similar elements will be denoted by the same or similar reference numerals, and redundant descriptions will be omitted or briefly described. Descriptions will be made focusing on differences from the above exemplary embodiment. Each feature may be obtained either as designed or unintentionally during the fabricating process.

Figure 4:
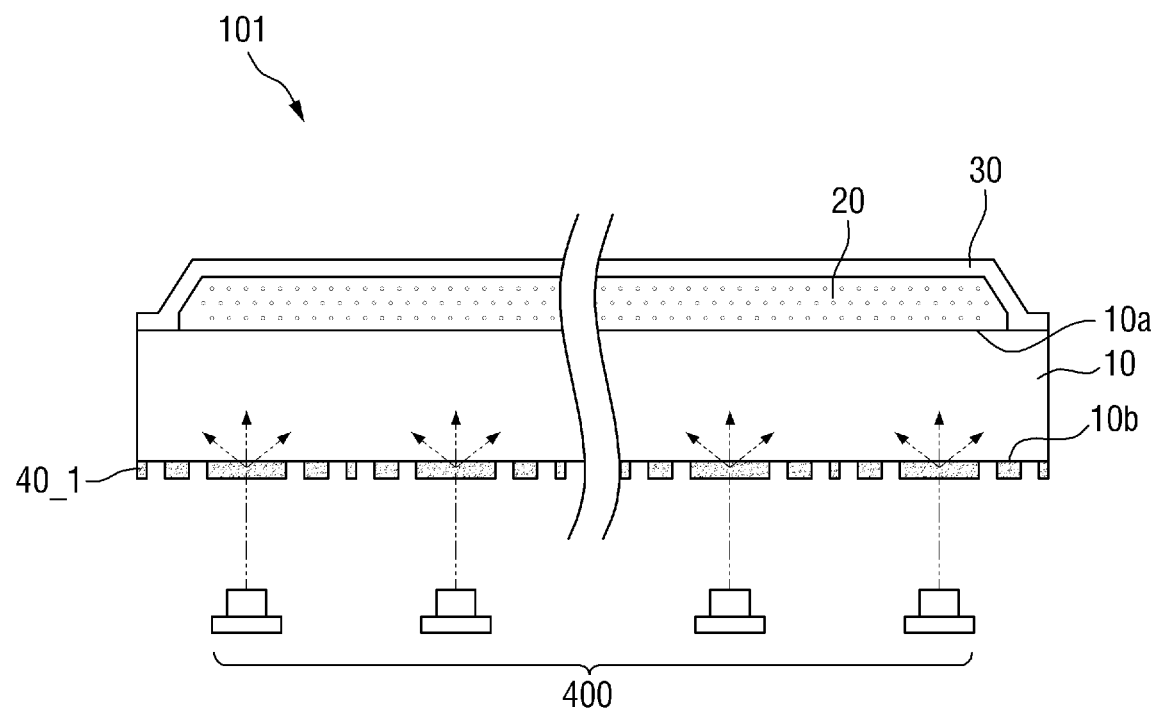
FIG. 4 is a cross-sectional view of an optical member according to another exemplary embodiment of the invention.
Figure 5:
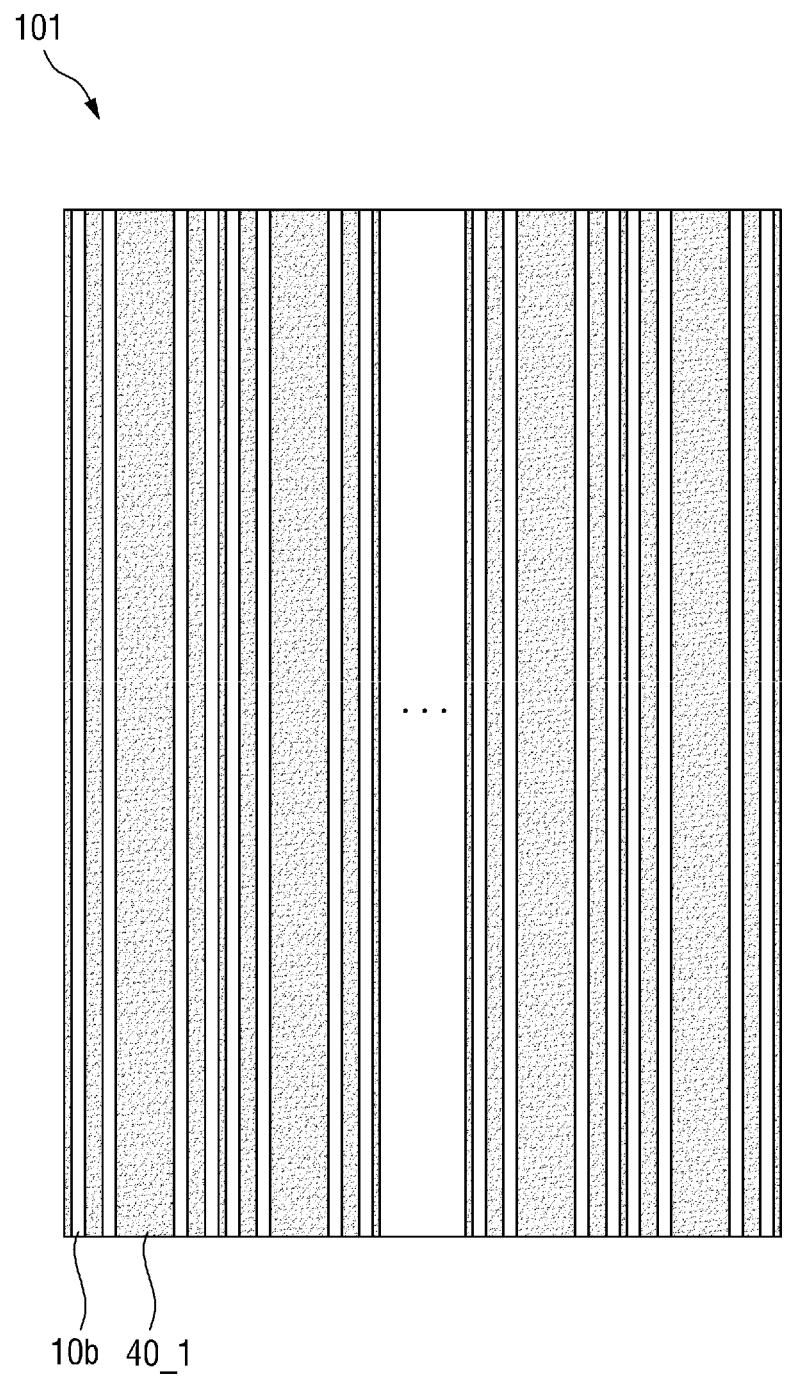
FIG. 5 is a view showing the rear of the optical member shown in FIG. 4.
Figure 6:
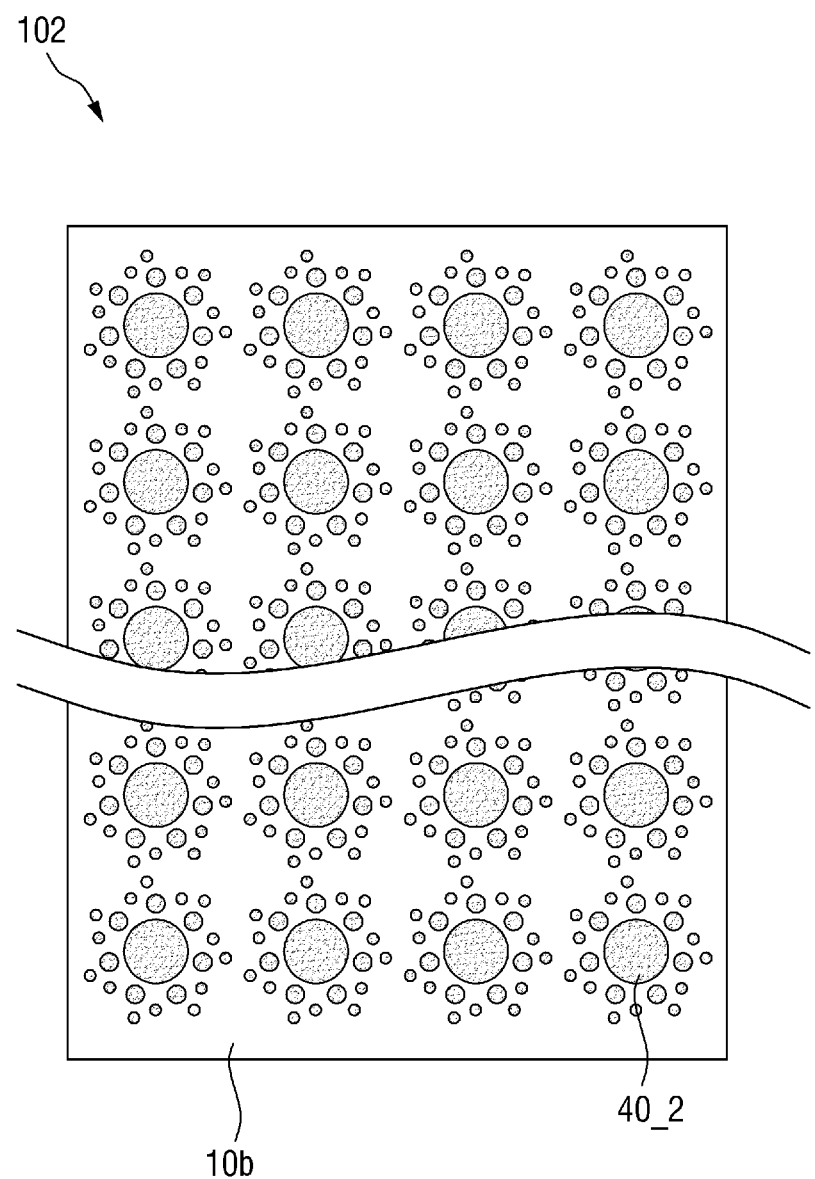
FIG. 6 is a view showing the rear of the optical member according to yet another exemplary embodiment of the invention.

FIG. 4 is a cross-sectional view of an optical member according to another exemplary embodiment of the invention. FIG. 5 is a view showing the rear of the optical member shown in FIG. 4. FIG. 6 is a view showing the rear of the optical member according to yet another exemplary embodiment of the invention. FIGS. 4 to 6 illustrate modifications of the exemplary embodiments of the invention where the arrangement of the diffusing pattern 40 of the optical member 100 is changed.

Referring to FIGS. 4 to 6, the diffusing patterns 40_1 and 40_2 of the optical members 101 and 102 may not completely cover the bottom surface 10b of the diffuser plate 10. Specifically, unlike the exemplary embodiment of FIG. 2, the densities of the diffusing patterns 40_1 and 40_2 may vary from region to region.

For example, in a region closer to the light source 400 where a greater amount of light is incident, the arrangement density of the diffusing patterns 40_1 and 40_2 may be increased. On the contrary, in a region distant from the light source 400 where a smaller amount of light is incident, the arrangement density of the diffusing patterns 40_1 and 40_2 may be decreased. As mentioned earlier, since light generally propagates in a straight line, more light can be incident on a region closer to the light sources 400 than a region distant from the light sources 400. By densely arranging the diffusing patterns 40_1 and 40_2 in a region closer to the light sources 400, the light concentrated in the region can be guided to a region where the amount of light is insufficient. In addition, by sparsely arranging the diffusing patterns 40_1 and 40_2 in a region where the amount of light is insufficient, it is possible to reduce the amount of light diffused to other regions.

The diffusing pattern 40_1 may have a stripe shape extending along a direction in which the light sources 400 are arranged, as shown in FIG. 5.

For example, the LED light sources 410 may be mounted on the respective printed circuit boards 420 arranged along the longer side of the diffuser plate 10, as shown in FIG. 1. In this case, there may be regions where the amount of light is larger and regions where the amount of the light is less. The area of the diffusing pattern 40_1 may be large where the amount of light is larger, and may be smaller where the amount of light is less. That is, the diffusing pattern 40_1 may be extended in the longer side direction of the diffuser plate 10, and may be arranged in a stripe shape having a different width in the shorter side direction.

The diffusing pattern 40_2 may be radially arranged, as shown in FIG. 6. In an exemplary embodiment, each unit of the diffusing pattern 40_2 includes a plurality of circles having different areas. The largest circle is located at the center of the unit closer to the respective light sources 400. The areas of the circles may decrease away from the center. In another exemplary embodiment, the circles of the diffusing pattern 40_2 may have the same size and the same area, and the circles are more densely arranged in a region where a greater amount of light is incident, whereas the circles are more sparsely arranged in a region where a smaller amount of light is incident.

Although the diffusing pattern 40_2 is shown as consisting of circles when viewed from the top in a plan view, this is merely illustrative. In other implementations, it may consist of polygons, such as rectangles or triangles.

Figure 7:
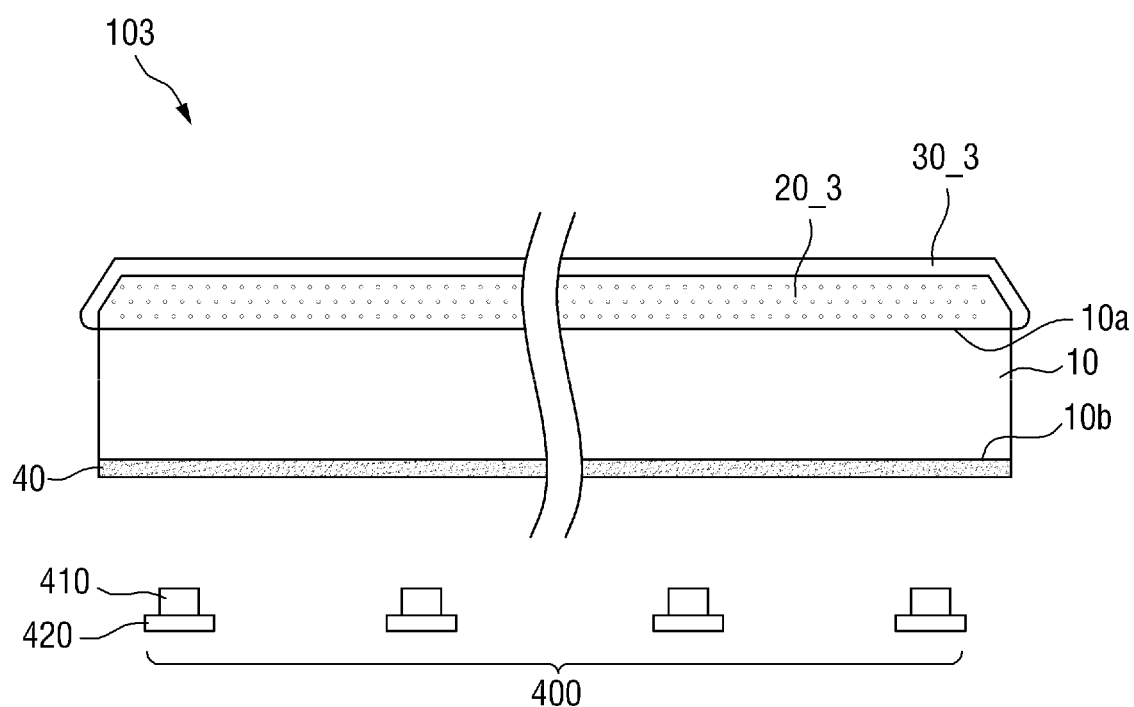
FIG. 7 and FIG. 8 are cross-sectional views of an optical member according to yet another exemplary embodiment of the invention.
Figure 8:
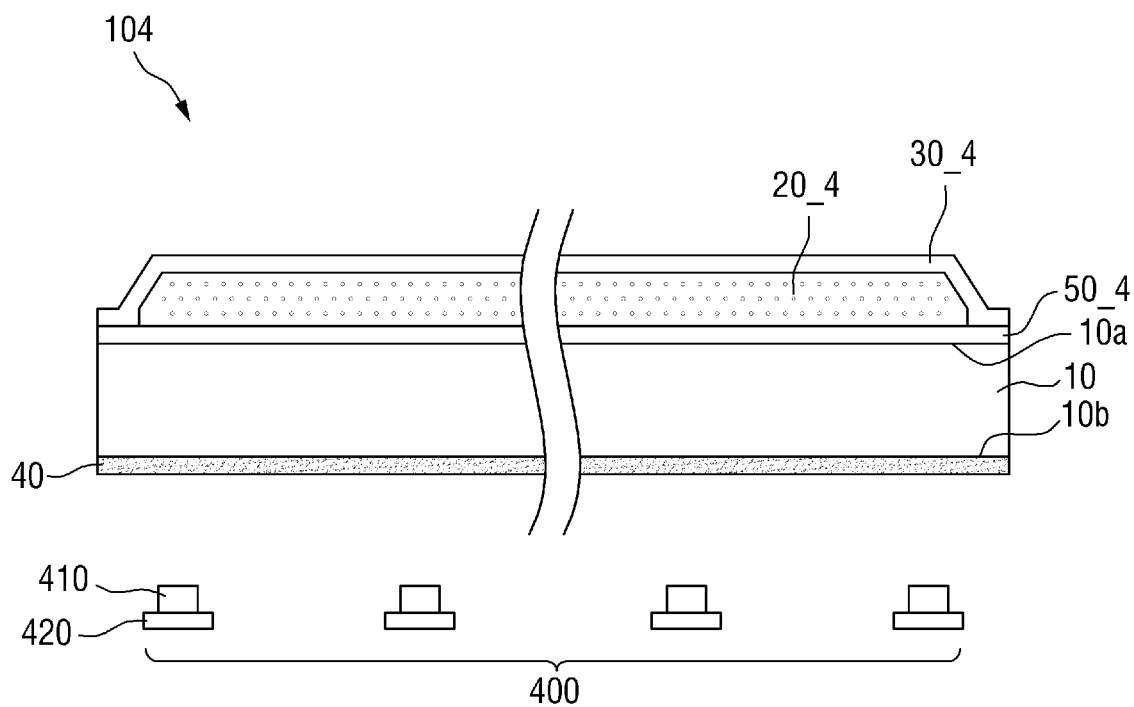

FIGS. 7 and 8 are cross-sectional views of an optical member according to yet another exemplary embodiment of the invention. FIGS. 7 to 8 illustrate modifications of the exemplary embodiment of the invention in which the arrangement and alignment of the elements are changed.

FIG. 7 illustrates an example where a side surface of a passivation layer 30_3 of an optical member 103 may protrude outwardly more than a side surface of a diffuser plate 10. For example, as shown in FIG. 7, the side surface of the wavelength conversion layer 20 may be aligned with the side surface of the diffuser plate 10, and the passivation layer 30_3 may be extended outwardly more than the side surface of the wavelength conversion layer 20_3, such that the side surface of the wavelength conversion layer 20_3 may be covered. In an exemplary embodiment, the passivation layer 30_3 may cover a part of the side surface of the diffuser plate 10 as well. The exemplary embodiment shown in FIG. 7 may be advantageous in increasing the wavelength conversion effective area of the wavelength conversion layer 20_3.

In FIG. 8, an optical member 104 may further include a barrier layer 50_4 disposed on the top surface 10a of a diffuser plate 10. From the perspective of arrangement of the elements, the top surface 10a of the diffuser plate 10 of FIG. 2 may be replaced with the top surface of the barrier layer 50_4 in this exemplary embodiment.

Referring specifically to FIG. 8, the barrier layer 50_4 is disposed on the top surface 10a of the diffuser plate 10, and a wavelength conversion layer 20_4 and a passivation layer 30_4 are sequentially stacked on the barrier layer 50_4. The barrier layer 50_4 may cover the entire top surface 10a of the diffuser plate 10. The side surface of the barrier layer 50_4 may be aligned with the side surface of the diffuser plate 10.

The wavelength conversion layer 20_4 is formed in contact with the top surface of the barrier layer 50_4. The barrier layer 50_4 serves to prevent permeation of moisture and/or oxygen (hereinafter, referred to as moisture/oxygen) in the same manner as the passivation layer 30_4. The barrier layer 50_4 may include an inorganic material. For example, the barrier layer 50_4 may include silicon nitride, aluminum nitride, zirconium nitride, titanium nitride, hafnium nitride, tantalum nitride, silicon oxide, aluminum oxide, titanium oxide, tin oxide, cerium oxide and silicon oxynitride, or a metal thin film with light transmittance. The barrier layer 50_4 may be made of, but is not limited to, the same material as the passivation layer 40_4. The barrier layer 50_4 may be formed by chemical vapor deposition or the like.

The thickness of the barrier layer 50_4 may be similar to that of the passivation layer 30_4. For example, the thickness of the barrier layer 50_4 may range from 0.1 to 2 μm.

As described above, according to this exemplary embodiment, the sealing structure for the wavelength conversion layer 20_4 can be implemented by the passivation layer 30_4 and the barrier layer 50_4. Therefore, even if the diffuser plate 10 fails to block moisture/oxygen permeation sufficiently, the barrier layer 50_4 can effectively prevent moisture/oxygen permeation. In view of the above, the degree of freedom in selecting the constituent material of the diffuser plate 10 can be increased. For example, even if a polymer resin, such as polymethylmethacrylate (PMMA), polycarbonate (PC) and acrylic resin is used for the diffuser plate 10, instead of an inorganic material such as glass, the moisture/oxygen permeation is prevented by the barrier layer 50_4, thereby preventing deterioration of the wavelength conversion layer 20_4.

Figure 9:
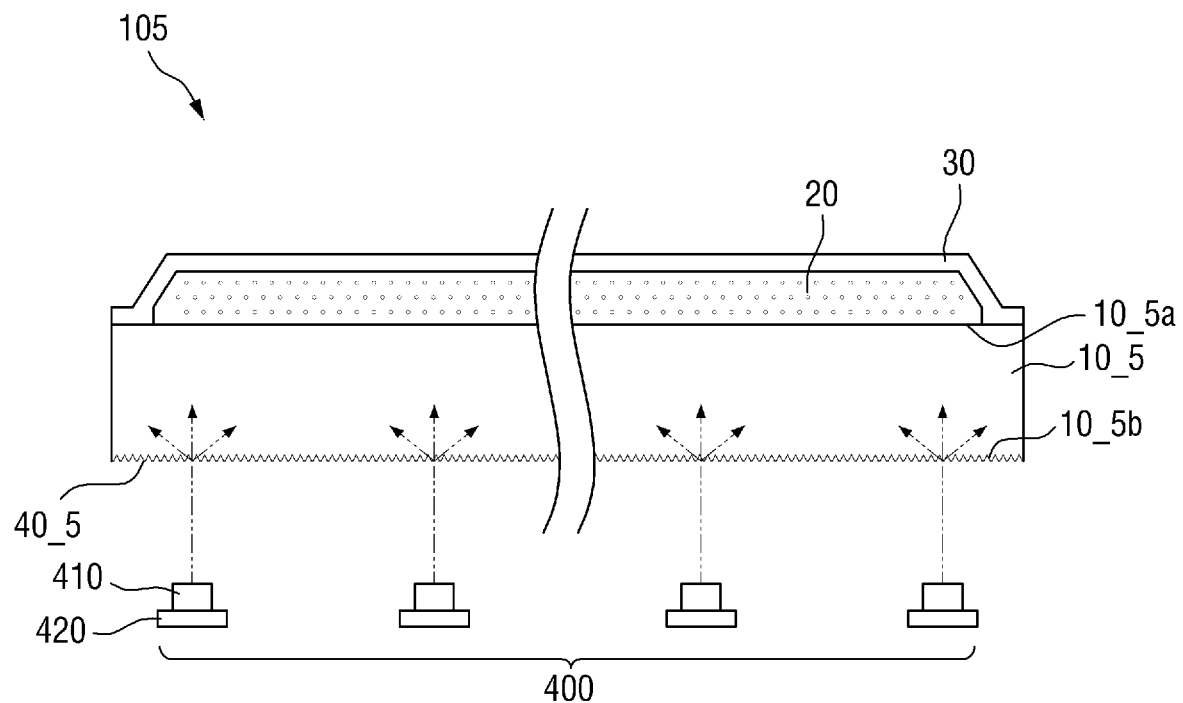
FIG. 9 and FIG. 10 are cross-sectional views of an optical member according to yet another exemplary embodiment of the invention.
Figure 10:
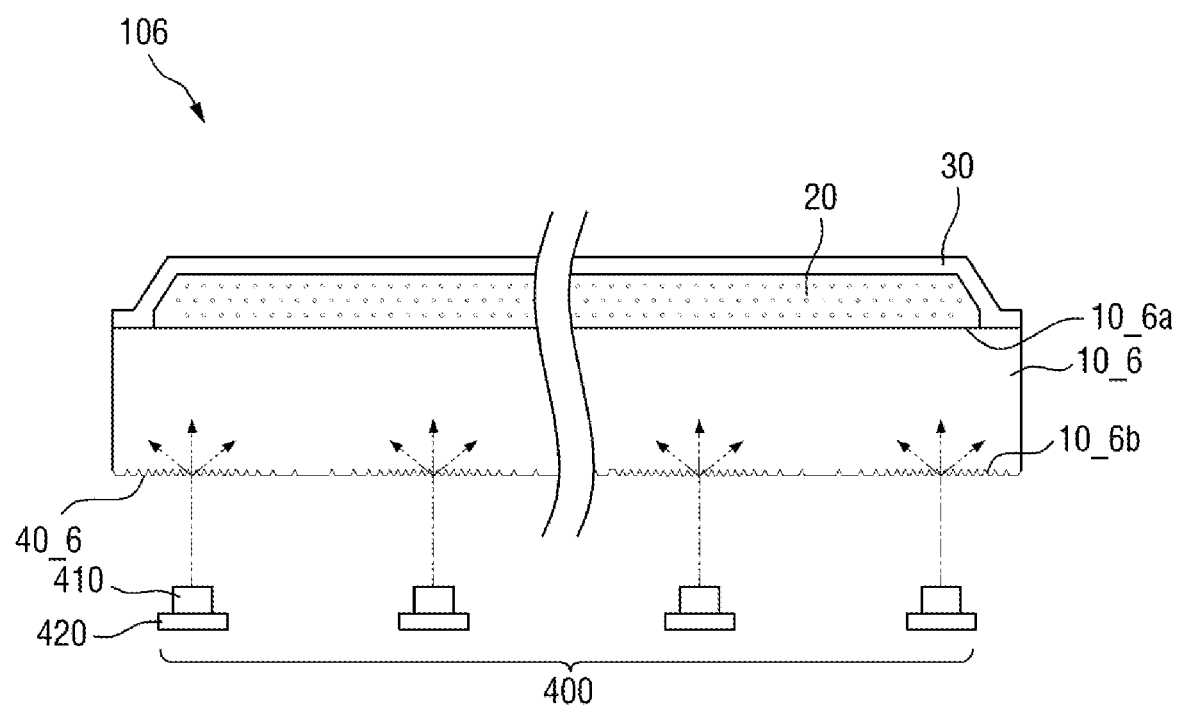

FIGS. 9 and 10 are cross-sectional views of an optical member according to yet another exemplary embodiment of the invention.

The optical members 105 and 106 according to this exemplary embodiment are different from the optical member according to the exemplary embodiment of FIG. 2 in that they include diffusing patterns 40_5 and 40_6 formed as their surfaces of the bottom surfaces 10_5b and 10_6b of the diffuser plates 10_5 and 10_6.

Referring specifically to FIG. 9, a diffusing pattern 40_5 having a fine concave-convex shape may be formed on the bottom surface 10_5b of the diffuser plate 10_5. The diffusing pattern 40_5 may be a nano-sized concave-convex shape. The diffusing pattern 40_5 includes a convex pattern and a concave pattern, and the widths of the convex pattern and the concave pattern may be irregular. However, in other implementations, the widths of the convex pattern and the concave pattern may be regular, and the width of the convex pattern may be different from or equal to the width of the concave pattern.

The light has different incidence angles depending on the shape of the concave-convex pattern on the surface of the diffuser plate 10_5, and accordingly, the traveling direction of light is changed into random directions. If the surface roughness of the bottom surface 10_5b of the diffuser plate 10_5 is too low, the light diffusion rate is so low that sufficient luminance uniformity cannot be achieved. Accordingly, the surface roughness Ra of the diffuser pattern 40_5 may be approximately 5 or more.

The diffuser pattern 40_5 may be formed by sand blasting or the like. For example, sand may be sprayed onto and pressed against the bottom surface 10b_5 of the diffuser plate 10_5 to form a fine concave-convex shape, and then the diffusing pattern 40_5 is formed by cleaning it. However, this is merely illustrative. A variety of other methods may be employed.

The diffusing pattern 40_5 may be formed on the entire bottom surface 10_5b of the diffuser plate 10_5. In other implementations, however, the diffusing pattern 40_5 may be formed on only a part of the bottom surface 10_5b, as shown in FIG. 10.

Referring to FIG. 10, the diffusing pattern 40_6 may have different densities depending on the amount of light. Specifically, the diffusing pattern 40_6 may be formed densely in a region closer to the light sources 400 where a larger amount of light is incident, whereas the diffusing pattern 40_6 may be formed sparsely away from the light sources. For example, when the diffusing pattern 40_6 includes a concave pattern and a convex pattern, the widths of the concave/convex patterns may be smaller in a region adjacent to the light sources 400 than in a region distant from the light sources 400.

The diffusing pattern 40_6 of the optical member 106 may have the same shape as the diffusing patterns 40_1 and 40_2 of the optical members 101 and 102 according to FIGS. 5 and 6 when viewed from the top. That is, the diffusing pattern 40_6 may be formed in a stripe shape or in a radial shape when viewed from the top in a plan view.

When the diffusing patterns 40_5 and 40_6 are formed as the surfaces of the diffusion plates 10_5 and 10_6 as shown in FIGS. 9 and 10, there is no concern that the diffusing patterns 40_5 and 40_6 are separated from the diffusion plates 10_5 and 10_6, and the fabricating process can be simplified.

Figure 11:
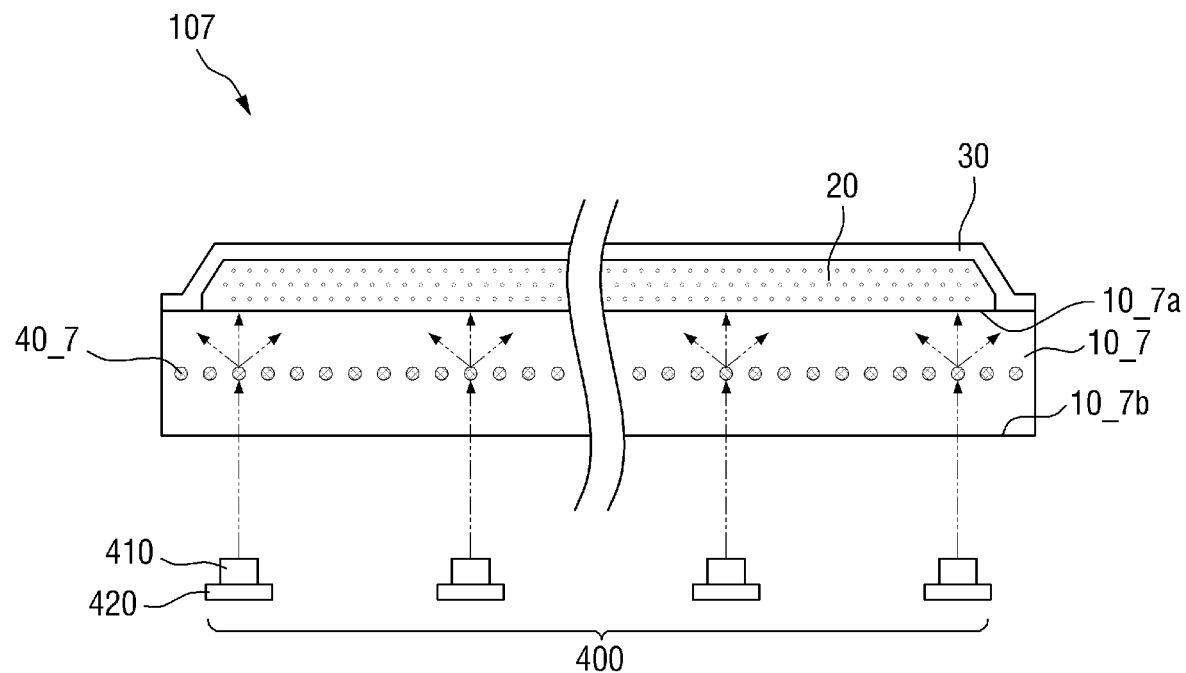
FIG. 11 and FIG. 12 are cross-sectional views of an optical member according to yet another exemplary embodiment of the invention.
Figure 12:
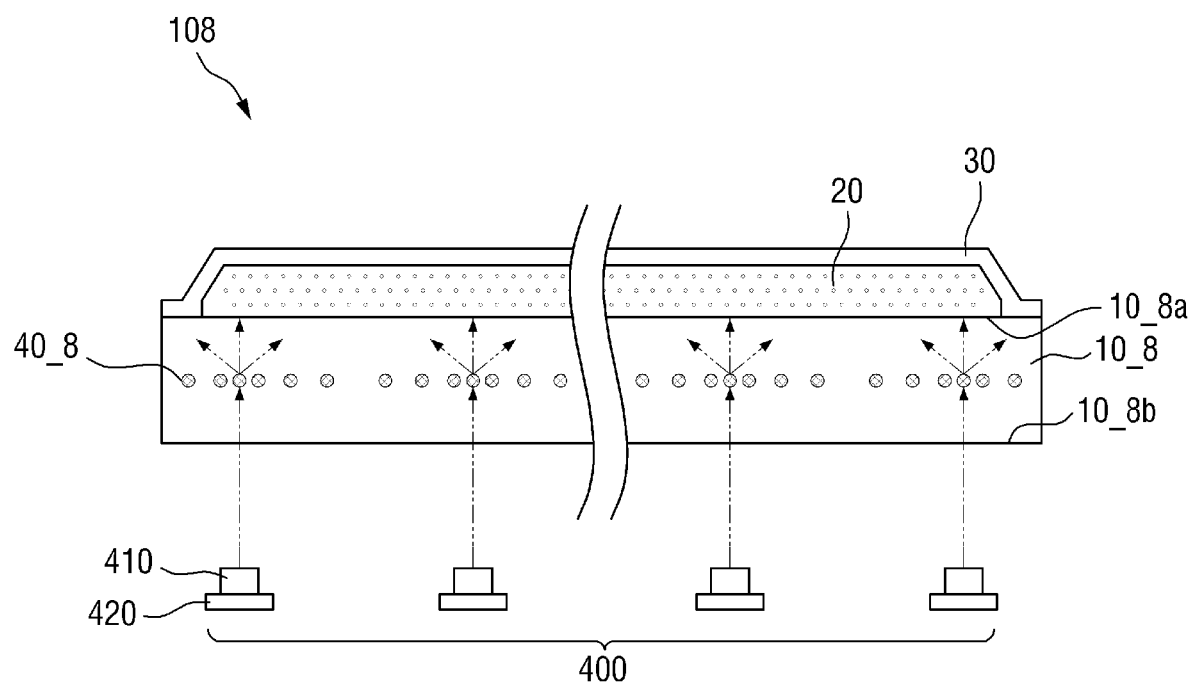

FIGS. 11 and 12 are cross-sectional views of an optical member according to yet another exemplary embodiment of the invention.

The optical members 107 and 108 according to this exemplary embodiment are different from those of FIGS. 2, 9, and 10 in that diffusing patterns 40_7 and 40_8 are formed inside the diffuser plates 10_7 and 10_8.

Referring specifically to FIG. 11, the diffusing pattern 40_7 may be formed inside the diffuser plate 10_7. Although the diffusing pattern 40_7 is shown as being formed at the center portion of the diffuser plate 10_7, this is merely illustrative. For example, the diffusing pattern 40_7 may be formed adjacent to the bottom surface 10_7b of the diffuser plate 10_7. Then, the distance between the display panel (not shown) and the diffusing pattern 40_7 becomes larger, so that the light distribution can be more uniformly observed in the display panel.

The diffusing pattern 40_7 may be formed as, but is not limited to, a square pillar, a triangular pillar, a circular column, or a sphere. Any of variety of shapes is possible as long as the shape is suitable for diffusing light. Although not shown in the drawings, the diffusing pattern 40_7 may be formed in a planar shape, and the planar diffusing pattern 40_7 may be disposed in parallel with the bottom surface 10_7b of the diffuser plate 10_7. In addition, the diffuser pattern 40_7 may be made up of a plurality of layers, and the density of the diffusing pattern 40_7 may be different for different layers.

The diffusing pattern 40_7 may have equal spacing. In other implementations, however, the diffusing pattern 40_7 may have different densities, as shown in FIG. 12.

Referring to FIG. 12, the density of the diffusing pattern 40_6 may vary depending on the amount of light. The diffusing pattern 40_8 may be densely formed in a region close to the light sources 400 and may be formed sparsely away from the light sources.

Although not shown in the drawings, more than one diffusing pattern 40_8 may be formed in a region where a larger amount of light is incident, so that more light can be diffused.

The diffusing patterns 40_7 and 40_8 may be formed by laser processing or the like. For example, the diffusing patterns 40_7 and 40_8 for diffusing light may be formed by irradiating a laser inside the diffusion plates 10_7 and 10_8 to create regions having different densities.

When the diffusing patterns 40_7 and 40_8 are formed inside the diffusion plates 10_7 and 10_8, as shown in FIGS. 11 and 12, there is no concern that the diffusing patterns 40_7 and 40_8 are separated from the diffusion plates 10_7 and 10_8, and an additional member can be disposed thereunder.

Figure 13:
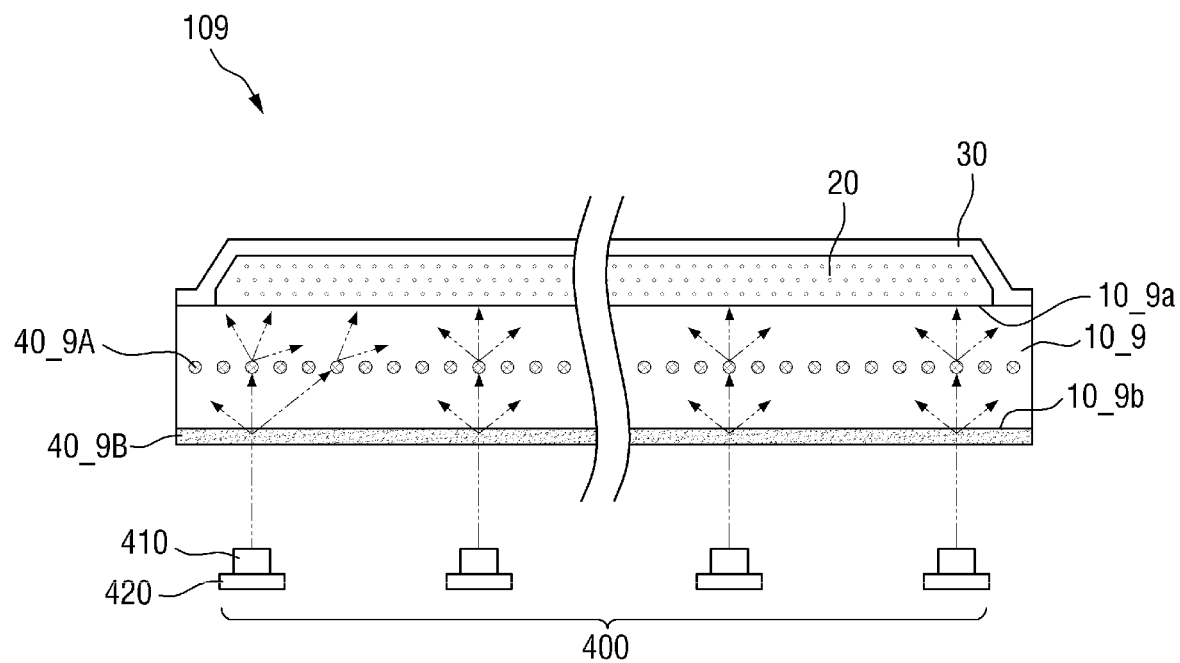
FIG. 13 is a cross-sectional view of an optical member according to yet another exemplary embodiment of the invention.

FIG. 13 is a cross-sectional view of an optical member according to yet another exemplary embodiment of the invention.

Referring to FIG. 13, the optical member 109 may include a first diffusing pattern 40_9A formed inside the diffuser plate 10_9, and a second diffusing pattern 40_9B disposed on the bottom surface 10_9b of the diffuser plate 10_9.

As described above, by disposing the first diffusing pattern 40_9A in the diffuser plate 10_9, it is possible to perform additional processing on the bottom surface 10_9b of the diffuser plate 10_9.

Although an additional diffusing pattern is disposed on the bottom surface 10_8b of the diffuser plate 10_8 as the second diffusing pattern 40_9B, this is merely illustrative. The second diffusing pattern 40_9B may be formed in the bottom surface 10_8b of the diffuser plate 10_8.

At least some of the light emitted from the light sources 400 may be primarily diffused by the second diffusing pattern 40_9B, and may be secondarily diffused by the first diffusing pattern 40_9A. Some of the light may not pass through the diffusion particles in the second diffusing pattern 40_9B, and in this case, it may be diffused only by the first diffusing pattern 40_9A.

The light diffused twice by the first diffusing pattern 40_9A and the second diffusing pattern 40_9B can be more evenly distributed over the entire surface of the diffuser plate 10_9. In addition, since the light not diffused by the second diffusing pattern 40_9B can be diffused by the first diffusing pattern 40_9A, the probability that light is diffused can be increased. As a result, luminance uniformity can be further improved.

Figure 14:
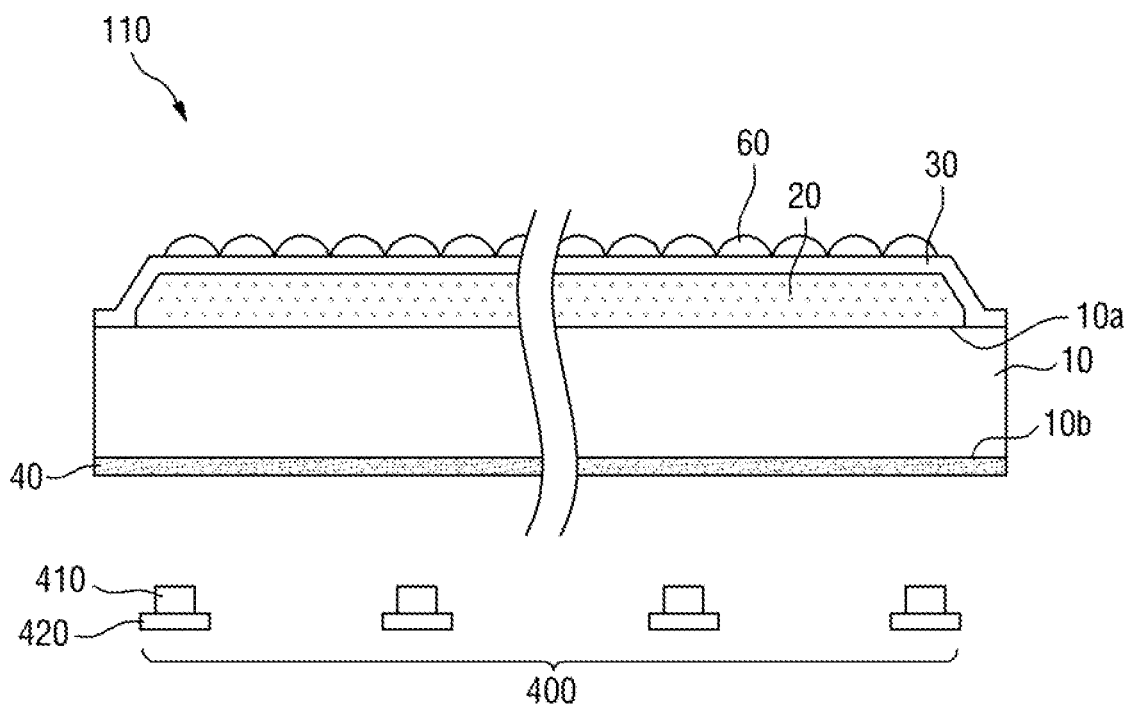
FIG. 14 is a cross-sectional view of an optical member according to yet another exemplary embodiment of the invention.

FIG. 14 is a cross-sectional view of an optical member according to yet another exemplary embodiment of the invention.

The optical member 110 according to this exemplary embodiment is different from the optical member according to the exemplary embodiment shown in FIG. 2 in that the former further includes an optical pattern 60.

Referring specifically to FIG. 14, the wavelength conversion layer 20 is disposed on the top surface 10a of the diffuser plate 10, and the passivation layer 30 and the optical pattern 60 are sequentially stacked thereon. A diffusing pattern 40 is disposed on the bottom surface 10b of the diffuser plate 10.

The optical pattern 60 may be a microlens array pattern or a lenticular pattern. In other implementations, however, other various optical patterns may be employed as long as they can condense and diffuse light.

The optical pattern 60 may be formed on the entire top surface of the passivation layer 30. In other implementations, however, the optical pattern 60 may be formed only on a part of the top surface of the passivation layer 30. For example, the optical pattern 60 covers most of the top surface of the passivation layer 30, but may expose a part of the edge.

The optical pattern 60 may be formed on the top surface of the passivation layer 30. The optical pattern 60 may be formed by imprinting or the like. For example, the optical pattern 60 may be formed by distributing the resin on the top surface of the passivation layer 30, forming a pattern with a stamper, and then curing it.

The light emitted from the light sources 400 is diffused several times by the diffusing pattern 40, the diffuser plate 10, the wavelength conversion layer 30, and the optical pattern 60, so that uniform luminance can be observed regardless of the arrangement of the light sources 400.

The optical members 100 to 110 according to the above-described various exemplary embodiments can be employed by a display device, a lighting device, and the like. Hereinafter, an example of a display device including an optical member will be described in detail.

Figure 15:
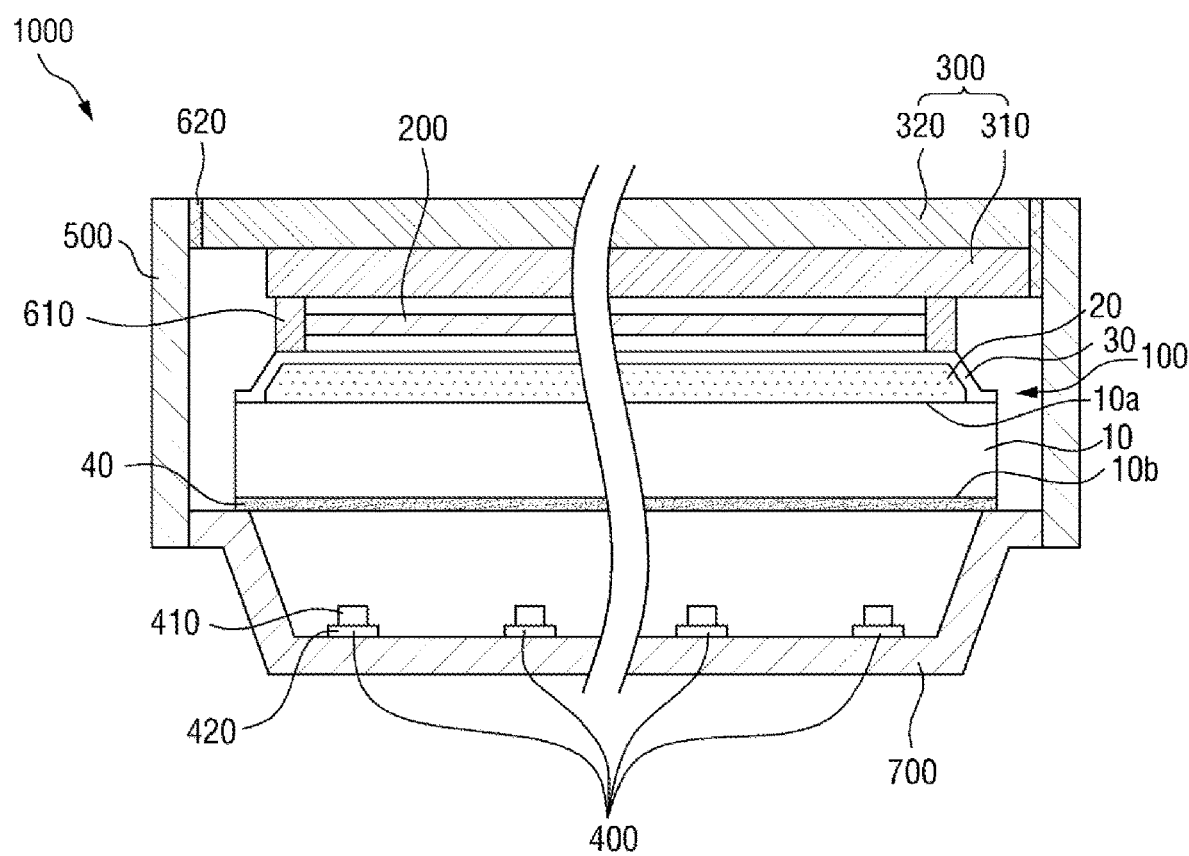
FIG. 15 is a cross-sectional view of a display device according to the exemplary embodiments of the invention.

FIG. 15 is a cross-sectional view of a display device according to exemplary embodiments of the invention.

Referring to FIG. 15, a display device 1000 includes an optical member 100, light sources 400 disposed under the optical member 100, and a display panel 300 disposed above the optical member 100.

Any of the above-described optical members 100 to 110 may be employed as the optical member. In FIG. 15, the optical member 100 of FIG. 2 is employed.

The light sources 400 are disposed under the optical member 100. Accordingly, the bezel area can be reduced as compared with the device where the light sources 400 are disposed on one side of the optical member 100. The light source 400 may include either point light sources or line light sources. The point light source may be a light-emitting diode (LED) light sources 410. The plurality of LED light sources 410 may be mounted on the printed circuit board 420. The LED light sources 410 may emit light of blue wavelength. The LED light sources 410 may be top-emission LEDs that emit light upwardly.

The light of blue wavelength emitted from the LED light sources 410 is incident on the diffusing pattern 40 of the optical member 100. Typically, the light emitted from the LED light sources 410 has a straight propagation direction. The optical pattern 40 changes the propagation path of the light by making the light exit in random directions. As a result, the light is diffused from a region adjacent to the light sources 400 where a larger amount of light is incident and travels toward a region where a less amount of light is incident, such that the amount of light becomes uniform.

The light passing through the diffusing pattern 40 is diffused again through the diffuser plate 10. The wavelength conversion layer 20 of the optical member 100 converts a part of the light of the blue wavelength incident from the diffuser plate 10 into other wavelengths such as a green wavelength and a red wavelength. The converted lights of green wavelength and red wavelength exit upward toward the display panel 300 together with the unconverted light of blue wavelength.

The display panel 300 is disposed above the optical member 100. The display panel 300 receives light from the optical member 100 to display images thereon. Examples of such light-receiving display panels that display images by receiving light may include a liquid-crystal display panel, an electrophoretic panel, etc. Although a liquid-crystal display panel will be described as an example in the following description, any of a variety of other light-receiving display panels can be employed.

The display panel 300 may include a first substrate 310, a second substrate 320 facing the first substrate 310, and a liquid-crystal layer (not shown) disposed between the first substrate 310 and the second substrate 320. The first substrate 310 and the second substrate 320 overlap with each other. In an exemplary embodiment, one of the substrates may be larger than the other substrate so that it may protrude further outward. The protruding part of the second substrate 320 may provide a space for mounting the driving chip or an external circuit board. Unlike the illustrated example, the first substrate 310 located under the second substrate 320 may be larger than the second substrate 320 and protrude outward.

The optical member 100 may be coupled with the display panel 300 through an inter-module coupling member 610. The inter-module coupling member 610 may have a rectangular frame shape when viewed from the top. The inter-module coupling member 610 may be positioned at the edge of each of the display panel 300 and the optical member 100.

In an exemplary embodiment, the bottom surface of the inter-module coupling member 610 is disposed on the top surface of the passivation layer 30 of the optical member 100. The bottom surface of the inter-module coupling member 610 may be disposed on the passivation layer 30 so that it overlaps only with the top surface of the wavelength conversion layer 30 and not with the side surface.

The inter-module coupling member 610 may include a polymer resin, an adhesive tape, or the like. The inter-module coupling member 610 may further block the light transmission. For example, the inter-module coupling member 610 may include a light-absorbing material such as a black pigment and a dye, or may include a reflective material to block light transmission.

The display device 1000 may further include a housing 500 and a cover bottom 700. The housing 500 has open upper and lower faces opposed to each other, and each of the side walls may have a rectangular frame shape connected to one another. The housing 500 is coupled with the cover bottom 700. The cover bottom 700 includes a bottom face, side walls connected to the bottom face, and a protruding part protruding outward from the side walls. The light sources 400, the optical member 100, the display panel 300 and the like can be accommodated in the space defined by the housing 500 and the cover bottom 700.

The light sources 400 are disposed on the bottom surface of the cover bottom 700. The optical member 100 is disposed on the protruding part of the cover bottom 700 to provide a space between the light sources 400 and the optical member 100.

The cover bottom 700 may include a metal material to reflect light. Some of the light emitted from the light sources 400 may be reflected by the cover bottom 700 and then to be incident into the optical member 100. Although not shown in the drawing, the cover bottom 700 may further include a reflective member (not shown). The reflective member may cover the entire inner surface of the cover bottom 700. Specifically, the reflective member may be disposed to cover the bottom face of the cover bottom 700 and the entire inner surface of the side walls. The reflective member may include a reflective film or a reflective coating layer. The reflectance of the reflective member may be higher than that of the cover bottom 700.

The display panel 300 is disposed adjacent to the upper end of the side walls of the housing 500, and they may be coupled with one another by a housing coupling member 620. The housing member 620 may have a rectangular frame shape when viewed from the top. The housing coupling member 620 may include a polymer resin, an adhesive tape, or the like.

The display device 1000 may further include at least one optical film 200. One or more optical films 200 may be accommodated in a space surrounded by the inter-module coupling member 610 between the optical member 100 and the display panel 300. The side surfaces of the one or more optical films 200 may be attached to the inner side surfaces of the inter-module coupling member 610 in contact therewith. Although the optical film 200 and the optical member 100 are separated from each other, and the optical film 200 and the display panel 300 are separated from each other, they are not necessarily spaced apart from each other.

The optical film 200 may be a prism film, a diffusion film, a micro-lens film, a lenticular film, a polarizing film, a reflective polarizing film, a retardation film, or the like. The display device 1000 and 1001 may further include a plurality of optical films 200 of the same type or different types.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An optical member comprising:
    a diffuser plate;
    a diffusing pattern formed inside the diffuser plate;
    a wavelength conversion layer disposed on a top surface of the diffuser plate; and
    a passivation layer disposed on the wavelength conversion layer and covering an upper surface of the wavelength conversion layer,
    wherein:
    a haze value of the diffuser plate is equal to or greater than 90%;
    a light transmittance of the diffuser plate is 50% to 70%;
    the diffusing pattern is disposed between the top surface of the diffuser plate and a bottom surface of the diffuser plate; and
    the diffusing pattern is spaced apart from the top surface of the diffuser plate and a bottom surface of the diffuser plate.

2. The optical member of claim 1, wherein:
    the diffuser plate comprises:
        a first region having a relatively large amount of incident light; and
        a second region having a relatively small amount of incident light; and
    a density of the diffusing patterns decreases away from the first region.

3. The optical member of claim 1, further comprising a diffusing pattern layer disposed under the diffuser plate, the diffusing pattern layer comprising a binder layer and diffusion particles,
    wherein:
    the diffusing patter layer is configured to transmit light; and
    the diffusion particles are dispersed in the binder layer.

4. The optical member of claim 1, further comprising an optical pattern disposed on the passivation layer, wherein the optical pattern is a microlens array pattern or a lenticular pattern.

* * * * *